April 22, 1958     G. J. AGULE     2,831,995
ELECTRON TUBES WITH ROTATING ELECTRODES
Filed Oct. 31, 1955
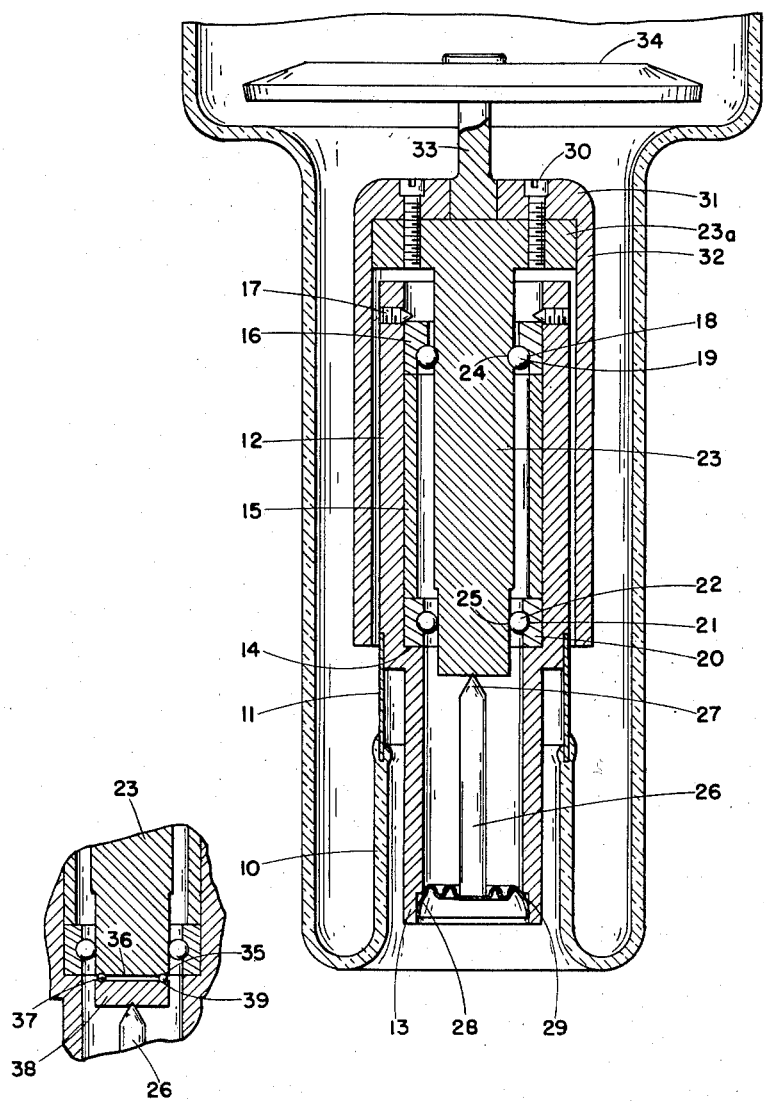
INVENTOR.
GEORGE J. AGULE
BY
ATTORNEYS United States Patent Office 2,831,995
Patented Apr. 22, 1958

2,831,995
ELECTRON TUBES WITH ROTATING ELECTRODES

George Joseph Agule, Stamford, Conn., assignor to Machlett Laboratories, Incorporated, Springdale, Conn., a corporation of Connecticut Application October 31, 1955, Serial No. 543,689

9 Claims. (Cl. 313—60)

This invention relates to improvements in bearing structures for electron discharge devices, and has particular reference to means for applying compression to such bearing structures. Still more specifically, this invention relates to the utilization of means for harnessing atmospheric pressure to supply the pressure for compression of bearings in electron tubes.

In vacuum tubes such as X-ray tubes of the rotating anode type, it is desirable that bearing structures which are in close proximity to heat sources having minimum clearance in order to reduce play and sliding friction which result in wear. However, due to the dimensional changes which occur in bearing structures as a result of heat, it would be useless to attempt to pre-load or machine the structures to a desired fit. Loose fitting bearing structures, therefore, must be used and in order to achieve the necessary fit it is essential to apply compressive forces to eliminate play and sliding friction between the bearings and between the bearings and their races. Play and sliding friction in combination with heat result in excessive wear on the bearings and races, strain the structure of the tube, and effectively shorten the life of the tube. Further objections to tubes wherein the bearings are not under pressure have arisen as the result of noise. Tubes with too much play have a tendency to give off vibrational, humming and clicking noises. In my United States Patents No. 2,625,664 and No. 2,648,025 I described means whereby ball bearings were forced up an inclined plane by a compressing force, thus separating the balls. The balls being thus separated, sliding friction therebetween was eliminated and noise resulting from the balls striking one another was stopped.

The prior art discloses spring means for compressing the bearing structures and though these means served the purpose, they were not completely satisfactory due to the inherent heat characteristics of high vacuum electron tubes.

Tubes of this type generate considerable heat, most of which is concentrated in the anode. When a spring is subjected to this heat its efficiency is greatly reduced. The heat anneals the metal and the spring loses its elasticity.

It is a primary object of this invention to eliminate spring compressioning of ball bearings in electron tubes by harnessing atmospheric pressure for such compressioning of the ball bearings.

For a better understanding of this invention reference is made to the accompanying drawing wherein like characters of reference designate like parts throughout the views, and wherein:

Fig. 1 is an axial sectional view of the anode structure of a rotating anode tube embodying a preferred form of the invention; and Fig. 2 is an enlarged fragmentary sectional view of a portion of the bearing structure of the device shown in Fig. 1 and illustrating a modification thereof.

The electron tube embodying the invention, as shown in Fig. 1, comprises an envelope having a reentrant neck portion 10 at one end which is sealed by a Kovar collar 11 to a substantially tubular-shaped bearing housing 12, a reduced end portion 13 of the housing extending exteriorly of the envelope through reentrant neck portion 10 for cooling purposes. Bearing housing 12 is provided on its inner surface with a circumferential shoulder 14 on which rests an annular bearing race 20, the race 20 engaging one end of a tubular member or cylinder 15 which is located within the housing 12. A second annular bearing race 16 is positioned within the housing 12 against the other end of the tubular member 15, and the assembly is held in place by set screws 17 which extend through the walls of the housing 12 adjacent the exposed end of race 16.

Race 16 is provided on its inner peripheral edge with a groove 18 in which ride a plurality of bearing elements such as balls 19 and a groove 21 is likewise formed on the inner surface of race 20 for other bearing elements 22.

A shaft 23 extends into the housing and tube assembly and rotates on the balls 19 and 22, a groove 24 being provided for the balls 19 circumferentially on the outer surface of the shaft 23. The portion of the shaft 23 that passes through the central opening of race 20 is of reduced diameter and the surface 25 thereof serves as the inner raceway 25 for the balls 22.

A pressure rod 26 is located within the end portion 13 of the housing 12 and is coaxial with shaft 23. The end portion 27 of rod 26 is conical in shape and the apex thereof engages the adjacent end of the shaft 23, enabling shaft 23 to rotate on its axis within the bearing structure. The opposite or outer end of rod 26 is secured to a diaphragm 28 which is preferably made of Monel, stainless steel, or other material suitable for the purpose. Diaphragm 28 is vacuum sealed throughout its periphery to the inner circumferential wall of end portion 13 of housing 12 and within a groove 29 formed in the inner surface thereof adjacent the end.

In the case of a rotating anode X-ray tube, a radial flange 23a at the target end of the shaft is fixed by means of axial screws 30 to a rotor shoulder 31, which in turn supports the rotor 32 and the target-supporting stem 33 atop which is mounted the rotating target 34.

In this preferred structure, the outer bearing races 16—20 are held in place. The shaft 23 carrying the inner races 24—25 is free to move longitudinally of its axis while it rotates. When pressure is put on the shaft, in the direction of the target 34, by the pressure rod 26 which has been forced in the direction of the target by the action of atmospheric pressure on the diaphragm 28, the inner race 24 on the shaft tends to force balls 19 into closer contact with outer race 18, thus eliminating play and sliding friction in this portion of the bearing structure. This is desirable due to the fact that this bearing portion of the bearing structure is in close proximity to the source of heat, the target 34, and carries the greater part of the work load. The combination of heat and work load plus play or sliding friction would tend to rapidly deteriorate the bearing structure.

In the bearing set comprising race 20 and balls 22 the minimal amount of play that will exist is of small import, because this bearing set, in effect, is merely a guide means for retaining the alignment of the rotatable shaft 23. Because of the relatively small amount of heat present in this part of the structure, this bearing set can be machined to close tolerances and these tolerances for the most part will be maintained while the tube is operating.

Referring to Fig. 2, the modification relates primarily to the contact between the pressure rod 26 and the rotatable shaft 23. The shaft 23 has an annular groove 35 formed in its end surface 36, concentric to the circumference of the shaft, but of a lesser diameter, which groove 35 is the upper race for balls 37. The balls 37 are held in place in their upper race by a disc 38 which has a groove 39 formed in its upper surface parallel with groove 35, which groove 39 serves as the lower race for balls 37. This bearing assembly is held in place by pressure rod 26 the conical end of the apex of which engages the lower surface of the disc at its center.

In the device constructed as shown in Fig. 2, sliding friction between pressure rod 26 and rotatable shaft 23 is replaced by rolling friction. The sliding friction of the structure shown in Fig. 1, however, may be minimized by various other means, such as the insertion of a sapphire pivot bearing at the point of contact between rod 26 and shaft 23 in Fig. 1.

From the foregoing description it is apparent that an improved bearing structure has been provided in accordance with the objects of this invention. It will also be apparent, however, that changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. An electron tube having an evacuated envelope, a rotatable electrode therein, a support carrying the electrode and mounted for rotation in bearings, the support being capable of lengthwise movement relative to the bearings under longitudinal pressure to eliminate sliding play and friction, and means for applying atmospheric pressure to said support longitudinally of said bearings and including a member responsive to atmospheric pressure which is connected to the support and to the envelope and exposed to the atmosphere exterior of the envelope.

2. An electron tube having an evacuated envelope, a rotatable electrode therein, a support carrying the electrode and mounted for rotation in bearings, the support being capable of lengthwise movement relative to the bearings under longitudinal pressure to eliminate sliding play and friction, and means for applying atmospheric pressure to said support longitudinally of said bearings comprising diaphragm connected to the support and to the envelope and exposed to the atmosphere exterior of the envelope.

3. An electron tube having an evacuated envelope, a rotatable electrode therein, a support carrying the electrode at one end and mounted for rotation in bearings, the support being capable of lengthwise movement relative to the bearings under longitudinal pressure to eliminate sliding play and friction, and means for applying atmospheric pressure to said support longitudinally of said bearings comprising a pressure rod axially aligned with the support and engaging the end thereof opposed to the electrode, and a diaphragm responsive to atmospheric pressure connected to the pressure rod and to the envelope and exposed to the atmospheric exterior of the envelope.

4. An electron tube having an evacuated envelope and a rotatable electrode therein, the mounting for the rotatable electrode including a rotatable shaft having thereon inner raceways for ball bearings, support means encircling the rotatable shaft and having thereon outer raceways for ball bearings, sets of balls located between the raceways, pressure means connected to the rotatable shaft for transmitting pressure to the ball bearing sets to take up play in the bearings, and means operatively connected with the pressure means for transmitting atmospheric pressure thereto.

5. An electron tube having an evacuated envelope and a rotatable electrode therein, the mounting for the rotatable electrode including a rotatable shaft having thereon inner raceways for ball bearings, support means encircling the rotatable shaft and having thereon outer raceways for ball bearings, sets of balls located between the raceways, a pressure rod connected to the rotatable shaft for transmitting pressure to the ball bearing sets to take up play in the bearings, and means connected to the pressure rod for transmitting atmospheric pressure to the pressure rod.

6. An electron tube having an evacuated envelope and a rotatable electrode therein, the mounting for the rotatable electrode including a rotatable shaft having thereon inner raceways for ball bearings, support means encircling the rotatable shaft and having thereon outer raceways for ball bearings, sets of balls located between the raceways, a pressure rod connected to and coaxial with the rotatable shaft for transmitting pressure to the ball bearing sets to take up play in the bearings, and a diaphragm connected to the pressure rod for transmitting atmospheric pressure to the presssure rod.

7. An electron tube having an evacuated envelope and a rotatable electrode therein, the mounting for the rotatable electrode including a shaft having thereon inner raceways for ball bearings, support means encircling the rotatable shaft and having thereon outer raceways for ball bearings, sets of balls located between the raceways, a pressure rod connected to the rotatable shaft for transmitting pressure to the ball bearing sets to take up play in the bearings, means between the pressure rod and the rotatable shaft for reducing friction therebetween, and a diaphragm connected to the pressure rod for transmitting atmospheric pressure to the pressure rod.

8. An electron tube having an evacuated envelope and a rotatable electrode therein, the mounting for the rotatable electrode including a rotatable shaft having thereon inner raceways for ball bearings, support means encircling the rotatable shaft and having thereon outer raceways for ball bearings, sets of balls located between the raceways, a pressure rod coaxial with and connected to the rotatable shaft for transmitting pressure to the ball bearing sets to take up play in the bearings, ball bearing means between the rotatable shaft and the pressure rod for reducing friction therebetween, and a diaphragm connected to the pressure rod for transmitting atmospheric pressure to the pressure rod.

9. An electron tube having an evacuated envelope and a rotatable electrode therein, the mounting for the rotatable electrode comprisng an annular housing, a rotatable shaft within the housing having thereon inner raceways for ball bearings, support means within the annular housing encircling the rotatable shaft and having thereon inner raceways for ball bearings, sets of balls located between the raceways, a pressure rod within the housing connected to and coaxial with the rotatable shaft for transmitting pressure to the ball bearing sets to take up play in the bearings, and a diaphragm located within the housing and connected to the pressure rod for transmitting atmospheric pressure to the pressure rod, said diaphragm being vacuum-sealed to the housing for preserving a vacuum in the tube.

No references cited.

U. S. DEPARTMENT OF COMMERCE

PATENT OFFICE

CERTIFICATE OF CORRECTION

Patent No. 2,831,995     George Joseph Agule     April 22, 1958

It is hereby certified that error appears in the printed specification of the above numbered patent requiring correction and that the said Letters Patent should read as corrected below.

Column 1, line 17, for "meains" read --means--; line 24, for "having" read --have--; column 2, line 17, for "plurailty" read --plurality--; column 4, line 58, for "inner" read --outer--.

Signed and sealed this 24th day of June 1958.

(SEAL)
Attest:

KARL H. AXLINE

Attesting Officer

ROBERT C. WATSON
Commissioner of Patents